United States Patent
Gozzini et al.

(10) Patent No.: US 10,122,269 B2
(45) Date of Patent: Nov. 6, 2018

(54) CURRENT MODE CONTROL OF A BUCK CONVERTER USING COUPLED INDUCTANCE

(71) Applicant: Apple Inc., Cupertino, CA (US)

(72) Inventors: Fabio Gozzini, San Jose, CA (US); Jay B. Fletcher, Austin, TX (US); Shawn Searles, Austin, TX (US); Sanjay Pant, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/402,827

(22) Filed: Jan. 10, 2017

(65) Prior Publication Data

US 2018/0083532 A1    Mar. 22, 2018

Related U.S. Application Data

(60) Provisional application No. 62/398,264, filed on Sep. 22, 2016.

(51) Int. Cl.
| | |
|---|---|
| *G05F 1/40* | (2006.01) |
| *H02M 3/156* | (2006.01) |
| *H02M 1/08* | (2006.01) |
| *H02M 3/158* | (2006.01) |
| *H02M 1/00* | (2006.01) |

(52) U.S. Cl.
CPC .............. *H02M 3/156* (2013.01); *H02M 1/08* (2013.01); *H02M 3/1584* (2013.01); *H02M 2001/0003* (2013.01); *H02M 2001/0009* (2013.01); *H02M 2001/0025* (2013.01); *H02M 2001/0064* (2013.01)

(58) Field of Classification Search
CPC .............. H02M 3/156; H02M 3/1584; H02M 2001/0032; G05F 1/40; Y02B 70/16
USPC ........... 363/17, 21.17, 97, 98; 323/222, 224, 323/225, 272, 282–290, 312, 315
See application file for complete search history.

(56) References Cited

U.S. PATENT DOCUMENTS

| | | | | |
|---|---|---|---|---|
| 5,629,608 | A * | 5/1997 | Budelman | G05F 1/618 323/268 |
| 7,233,132 | B1  | 6/2007 | Dong | |
| 7,425,819 | B2 * | 9/2008 | Isobe | H02M 3/156 323/222 |

(Continued)

OTHER PUBLICATIONS

International Search Report and Written Opinion from PCT/US2017/048468, dated Nov. 23, 2017, 15 pages.

(Continued)

*Primary Examiner* — Rajnikant Patel
(74) *Attorney, Agent, or Firm* — Meyertons, Hood, Kivlin, Kowert & Goetzel, P.C.

(57) ABSTRACT

A system that includes a regulator circuit is disclosed. The regulator circuit includes first and second phase units whose outputs are coupled to a power supply node of a circuit block, via respective coupled inductors. The first phase unit may initiate a charge cycle of the power supply node in response to assertion of a clock signal and generate a compensated current using currents measure through both inductors and the clock signal. In response to a determination that the compensated current is greater than a demand current generated using a voltage level of the power supply node and a reference voltage, the first phase unit may halt the charge cycle.

20 Claims, 7 Drawing Sheets

(56) References Cited

U.S. PATENT DOCUMENTS

| | | | | |
|---|---|---|---|---|
| 7,605,574 | B2* | 10/2009 | Dearn | H02M 3/156 |
| | | | | 323/282 |
| 7,893,669 | B2 | 2/2011 | Osterhout | |
| 7,965,070 | B2* | 6/2011 | Nakahashi | H02M 3/156 |
| | | | | 323/282 |
| 8,183,846 | B2* | 5/2012 | He | H02M 3/1584 |
| | | | | 323/282 |
| 8,994,352 | B2* | 3/2015 | Zhu | H02M 3/156 |
| | | | | 323/284 |
| 2009/0262555 | A1 | 10/2009 | Asuke | |
| 2014/0084884 | A1 | 3/2014 | Lee | |
| 2016/0111061 | A1 | 4/2016 | Thenus | |

OTHER PUBLICATIONS

Fei Yang, et al; "Input DM EMI filter design of interleaved CRM Boost PFC converter with coupled inductor", Energy Conversion Congress and Exposition (ECCE), 2011 IEEE, IEEE, Sep. 17, 2011, pp. 2614-2621.

Andrew J. Forsyth, et al; "Sampled-Data Analysis of the Dual-Interleaved Boost Converter With Interphase Transformer", IEEE Transactions on Power Electronics, Institute of Electrical and Electronics Engineers, USA, vol. 27, No. 3, Mar. 1, 2012, pp. 1338-1346.

* cited by examiner

CURRENT MODE CONTROL OF A BUCK CONVERTER USING COUPLED INDUCTANCE

PRIORITY INFORMATION

The present application claims benefit of priority to U.S. Provisional Application No. 62/398,264 titled "CURRENT MODE CONTROL OF A BUCK CONVERTER USING COUPLED INDUCTANCE" and filed on Sep. 22, 2016, both of which are hereby incorporated by reference in their entirety as though fully and completely set forth herein.

BACKGROUND

Technical Field

Embodiments described herein relate to integrated circuits, and more particularly, to techniques for generating regulated power supply voltages.

Description of the Related Art

A variety of electronic devices are now in daily use with consumers.

Particularly, mobile devices have become ubiquitous. Mobile devices may include cell phones, personal digital assistants (PDAs), smart phones that combine phone functionality and other computing functionality such as various PDA functionality and/or general application support, tablets, laptops, net tops, smart watches, wearable electronics, etc.

Such mobile devices may include multiple integrated circuits, each performing different tasks. In some cases, circuits that perform different tasks may be integrated into a single integrated forming a system on a chip (SoC). The different functional units within a SoC may operate at different power supply voltage levels. In some designs, power supply or regulator circuits may be included in, or external to, the SoC to generate different voltage levels for the myriad functional units included in the SoC.

Regulator circuits may include one or more reactive circuit components. For example, individual regulator sub-assemblies may employ a combination of inductors or capacitors. The reactive circuit components may be fabricated on an integrated circuit with the regulator circuits, or they may be included as discrete components in a semiconductor package or circuit board.

SUMMARY OF THE EMBODIMENTS

Various embodiments of a system including a regulator circuit and coupled inductors are disclosed. Broadly speaking, a system is contemplated in which a first inductor and a second inductor are coupled to a power supply node included in a load circuit, and the second inductor is inductively coupled to the first inductor. A transconductance circuit may be configured to generate a demand current using a voltage level of the power supply node and a reference voltage. A first phase unit may be configured to initiate a first charge cycle of the power supply node through the first to inductor in response to an assertion of a first clock signal and generate a first compensated current using a first current measured through the first inductor, a second current measured through the second inductor, and the first clock signal. The first phase unit may be further configured to halt the first charge cycle in response to a determination that the first compensated current is greater than the demand current.

In one embodiment, the first phase unit may be further configured to generate a first value of the first compensated current during a first portion of a period of the first clock signal.

In a further embodiment, the first phase unit may be further configured to generate a second value of the first compensated current during a second portion of the period of the first clock signal that is different than the first portion of the period.

BRIEF DESCRIPTION OF THE DRAWINGS

The following detailed description makes reference to the accompanying drawings, which are now briefly described.

Figure 1:
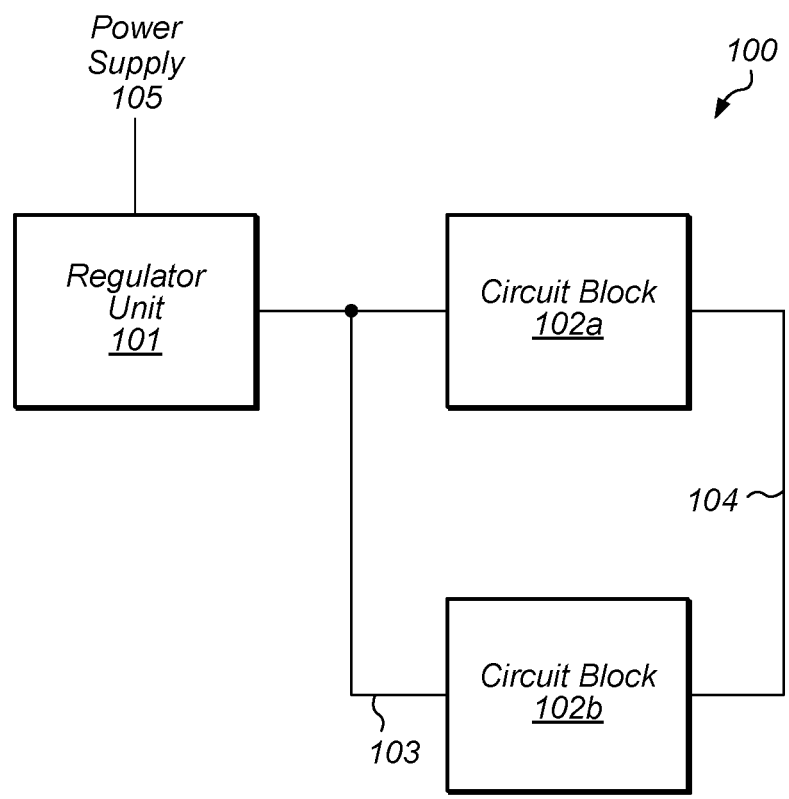
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Computing systems may include multiple functional units or circuit blocks. These circuit blocks may be mounted together in a common integrated circuit package, or circuit board. Some computing systems may include multiple functional units on a single integrated circuit, commonly referred to as a "System-on-a-chip" or "SoC." Each functional unit or circuit block within a computing system, may operate at a different voltage levels, which may be different than a voltage level of a master power supply of the power supply. In order to generate the desired voltage levels, one or more regulator units may be employed.

In some computing systems, DC-DC switching regulators are used to generate the desired voltage levels. Switching regulators rapidly switch a series of transistors on and off in order to transfer charge to a load through an inductor, such as one of the aforementioned functional units or circuit blocks. By adjusting the duration of the time individual transistors are switched on, the voltage level at the load may be kept within a predetermined range of a desired value.

Some switching regulators employ a current loop used to control the duration of the aforementioned transistors. This method of control, however, can lead to instability for some duty cycles. The source of the instability results from the regulator setting an output voltage by regulating the peak current through the inductor, while the voltage present at the load circuit block is based on the average current through the inductor. The difference between the peak and average inductor currents results in an error introducing instability into the control loop. By modifying (or "compensating") the slope of the current used in the control loop, stability may be maintained.

In some regulator designs, multiple phase units, each of which drive the load through a respective inductor. In some cases, the inductors are inductively coupled such that a change in current in one inductor may introduce a current in the other inductor. When using coupled inductors, the method of compensating the control loop (commonly referred to as "slope compensation") may be inadequate, resulting in control loop instability. The embodiments illustrated in the drawings and described below may provide techniques for performing slope compensation when using coupled inductors in a regulator circuit.

A block diagram of a computing system including multiple circuit blocks or functional units is illustrated in FIG. 1. In the illustrated embodiment, computing system 100 includes Regulator Unit 101, and Circuit Blocks 102a and 102b. Regulator Unit 101 is coupled to power supply 105, and regulated power supply 103. Circuit Blocks 102a and 102b are also coupled to regulated power supply 103. Additionally, Circuit Block 102a is coupled to Circuit Block 102b via communication bus 104.

As described below in more detail, Regulator Unit 101 may, in various embodiments, be configured to generate regulated power supply 103 using power supply 105. A voltage level of regulated power supply 103 may be less than, equal to, or greater than a voltage level of power supply 105 dependent upon the needs of Circuit Blocks 102a and 102b. Although only a single regulated power supply is depicted in the embodiment illustrated in FIG. 1, in other embodiments, multiple regulated power supplies may be employed. In such cases, different circuit blocks may be coupled different regulated power supplies. Alternatively, a single circuit block may be coupled to multiple regulated power supplies.

In the illustrated embodiment, either of Circuit Blocks 102a or 102b may include a processor, processor complex, or a memory. In some embodiments, Circuit Blocks 102a and 102b may include Input/Output (I/O) circuits or analog/mixed-signal circuits. In various embodiments, computing system 100 may be configured for use in a desktop computer, server, or in a mobile computing application such as, e.g., a tablet or laptop computer. It is noted that although FIG. 1 illustrates only two circuit blocks, in other embodiments, any suitable number of circuit blocks may be employed. Additional communication busses may also be employed to connect the various circuit blocks.

As used and described herein, a processor or processor complex having one or more processors or processor cores may, in various embodiments, be representative of a general-purpose processor that performs computational operations. For example, a processor may be a central processing unit (CPU) such as a microprocessor, a microcontroller, an application-specific integrated circuit (ASIC), or a field-programmable gate array (FPGA).

In the present disclosure, a memory describes any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example.

Analog/mixed-signal circuits may include a variety of circuits including, for example, a crystal oscillator, a phase-locked loop (PLL), an analog-to-digital converter (ADC), and a digital-to-analog converter (DAC) (all not shown). In other embodiments, analog/mixed-signal circuits included in one of Circuit Blocks 102a or 102b may include, radio frequency (RF) circuits that may be configured for operation with wireless networks.

As used herein, I/O circuits may be configured to coordinate data transfer between computing system 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits may be configured to implement a version of Universal Serial Bus (USB) protocol, IEEE 1394 (Firewire®) protocol, or an Ethernet (IEEE 802.3) networking standard such as Gigabit Ethernet or 10-Gigabit Ethernet.

In some embodiments, each of the aforementioned circuit blocks may include multiple circuits, each of which may include multiple devices, such as, e.g., metal-oxide semiconductor field-effect transistors (MOSFETs) connected via multiple wires fabricated on multiple conductive layers. The conductive layers may be interspersed with insulating layers, such as, silicon dioxide, for example. Each circuit may also contain wiring, fabricated on the conductive layers, designated for a power supply net or a ground supply net.

Each of Regulator Unit 101 and Circuit Blocks 102a and 102b may, in various embodiments, be fabricated on a silicon wafer (or simply "wafer") along with numerous identical copies of Regulator Unit 101 and Circuit Blocks 102a and 102b, each of which may be referred to as a "chip" or "die." During manufacture, various manufacturing steps may be performed on each chip in parallel. Once the manufacturing process has been completed, the individual chips may be removed from the wafer by cutting or slicing through unused areas between each chip.

In other embodiments, Regulator Unit 101 may be fabricated on a separate chip than Circuit Blocks 102a and 102b. In such cases, Regulator Unit 101 and Circuit Blocks 102a and 102b may be coupled together inside a semiconductor package. Alternatively, Regulator Unit 101 and Circuit Blocks 102a and 102b may be mounted on a common circuit board or other suitable substrate. In such cases, wiring for regulated power supply 103 and communication bus 104 may include multiple metal layers fabricated into the package or circuit board.

Figure 2:
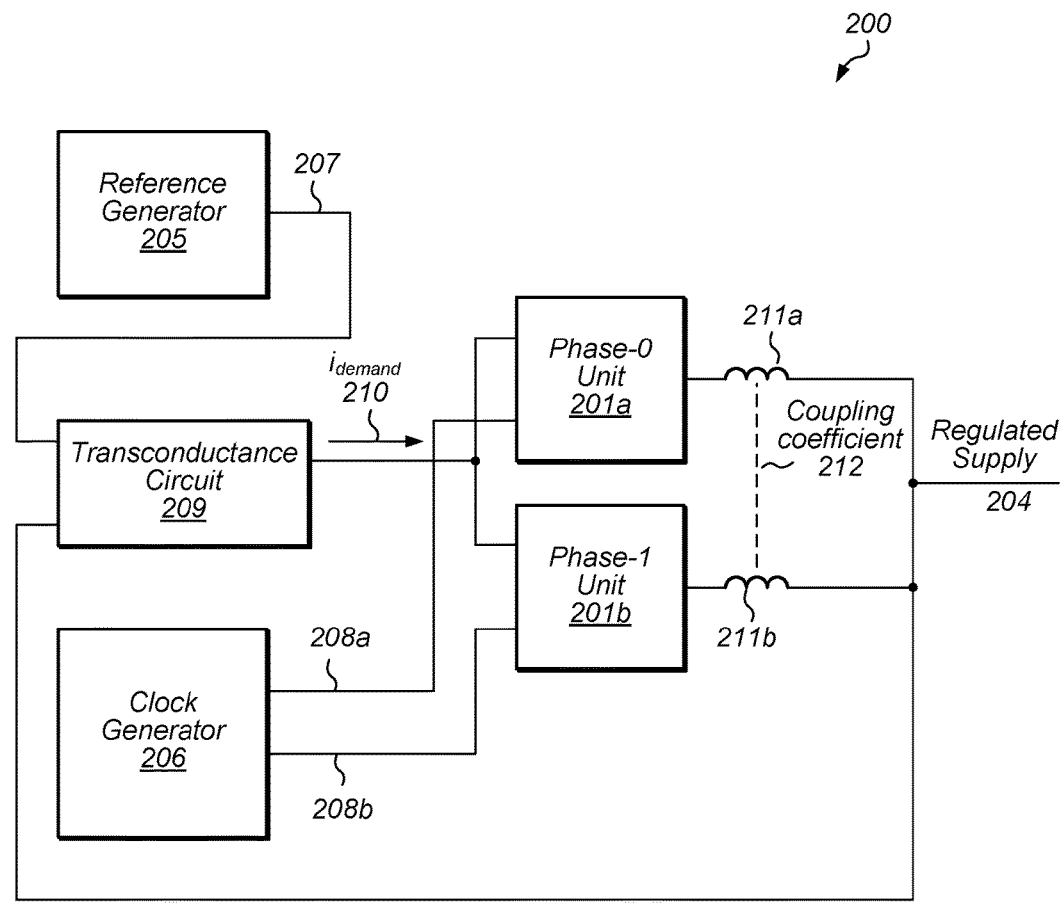
FIG. 2 illustrates an embodiment of a regulator unit.

Turning now to FIG. 2, an embodiment of a regulator unit is illustrated. Regulator unit 200 may, in various embodiments, correspond to Regulator Unit 101 as depicted in FIG. 1. In the illustrated embodiment, regulator unit 200 includes Phase-0 Unit 201a, Phase-1 Unit 201b, Reference Generator 205, Transconductance Circuit 209, inductors 211a and 211b, and Clock Generator 206.

Each of Phase-0 Unit 201a and Phase-1 Unit 201b may be configured to supply current to Regulated Supply 204 dependent upon reference voltage 207 and a respective one of clock signals 208a-d. It is noted that although four phase units are depicted in FIG. 2, in other embodiments, any suitable number of phase units may be employed.

During operation, as each of clocks signals 208a-d assert, a corresponding one of phase units 201a-d may source current through a respective inductor to regulated supply 204. A given phase unit of phase units 201a-d may be configured to monitor the current being sourced to regulated supply 204, and the sourced current may then be compared to a demand current generated locally in the given phase unit by the included transconductance amplifier. With each phase unit including a separate transconductance amplifier, less noise may be coupled into the demand current circuit node, thereby improving performance of the regulator unit.

Each phase unit may source current in sequence, with each phase unit sourcing a portion of the overall current to regulated supply 204. As the current demands on regulated supply 204 increase or decrease during operation of the computing system, an amount of current provided by an active phase unit may vary in order to maintain regulated supply 204 at a desired voltage level.

Inductor 211a is coupled between an output terminal of Phase-0 Unit 201a and Regulated Supply 204. In a similar fashion, inductor 211b is coupled between an output terminal of Phase-1 Unit 201b and Regulated Supply 204. Inductors 211a and 211b are also inductively coupled to each other. The amount of coupling is specified by Coupling coefficient 212. In various embodiments, the amount of coupled between inductors 211a and 211b may be determined based on the physical proximity between the two inductors. In some cases, additional materials may be deposited between the two inductors to enhance inductive coupling between the two inductors.

Inductors 211a and 211b may be included in an integrated circuit with the remaining circuits blocks of regulator unit 200. In other embodiments, inductors 211a and 211b may be fabricated on a separate integrated circuit die, which may then be coupled to an integrated circuit die including regulator unit 200 during a package assembly process.

Reference Generator 205 may be configured to generate a predetermined voltage level (also referred to herein as a "reference voltage level") for reference voltage 207. The reference voltage level may, in various embodiments, be adjustable upon completion of a manufacturing process. Alternatively, or additionally, the reference voltage level may be adjustable during operation by the programming of one or more registers (not shown) in response to changes in operating mode of a computing system, or in response to the execution of one or more software instructions by a processor included in the computing system.

In various embodiments, Reference Generator 205 may include a band gap reference circuit, or other suitable reference circuit, for generating a temperature and/or power supply independent reference voltage. Reference Generator 205 may also include one or more current mirrors, amplifiers, or other suitable analog circuitry necessary to adjust an initially generated voltage level to a desired level.

Clock Generator 206 may be configured to generate clock signals 208a-b. In various embodiments, a phase of clock signal 208a may be separated by a predetermined phase angle from a phase of clock signal 208b. For example, clock signal 208a may be separate from clock signal 208b by a phase angle of 180 degrees. Clock signals 208a-b are coupled to Phase-0 unit. It is noted that although four clocks signals are depicted in the embodiment illustrated in FIG. 2, in other embodiments, any suitable number of clocks signals may be employed.

In various embodiments, Clock Generator 206 may include a phase-locked loop (PLL) or other phase of delay locking circuit suitable for generating the desired phase difference between clocks signals 208a-b. Additionally, Clock Generator 206 may include an oscillator circuit configured to generate an initial clock signal for use the PLL or other phase locking circuits. In some embodiments, the initial clock signal may be generated external to Clock Generator 206 and regulator unit 200.

It is noted that the embodiment depicted in FIG. 2 is merely an example. In other embodiments, different functional units, and different arrangements of functional units are possible and contemplated.

Figure 3:
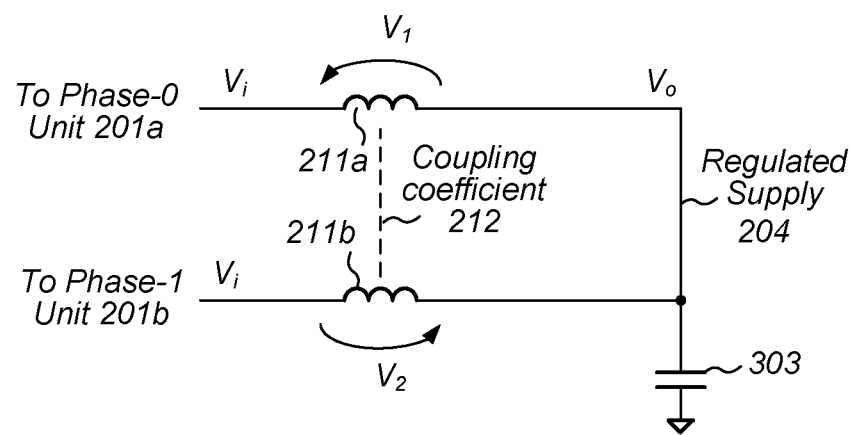
FIG. 3 depicts an embodiment of coupled inductors used in a regulator unit.

Turning to FIG. 3, an embodiment of coupled inductors is illustrated. In various embodiments, the coupled inductors depicted in FIG. 3 may correspond to inductors 211a and 211b as illustrated in FIG. 2. In the illustrated embodiment, inductor 211a is coupled to the Phase-0 Unit 201a and Regulated Supply 204. In a similar fashion, inductor 211b is coupled to Phase-1 Unit 201b and Regulated Supply 204. In various embodiments, capacitor 303 may represent the load of a circuit block, such as, e.g., Circuit Block 102a, coupled to Regulated Supply 204.

During operation, the across inductor 211a is given by Equation 1, and the voltage across inductor 211 is given by Equation 2, wherein M is the mutual coupling between inductors 211a and 211b, and L is the value of both inductors 211a and 211b.

$$v_1(t) = L\frac{di_1(t)}{dt} - M\frac{di_2(t)}{dt} \quad (1)$$

$$v_2(t) = L\frac{di_2(t)}{dt} - M\frac{di_1(t)}{dt} \quad (2)$$

As with many time domain circuit equations, expressing the time domain circuit equations in a different domain, such as, e.g., the frequency domain, may allow for simplified equations. In this case, to better understand the relationship between the currents flowing in the two inductors, the time domain voltages of Equations 1 and 2 may be expressed in the Laplace domain as shown in Equations 3 and 4.

$$V_1(s) = LsI_1(s) - MsI_2(s) \quad (3)$$

$$V_2(s) = LsI_2(s) - MsI_1(s) \quad (4)$$

Using Equations 3 and 4, an equation for voltage V1 in terms of voltage V2 may be determined, as depicted in Equation 5.

$$\frac{V_1(s)}{s} = \left(L - \frac{M^2}{L}\right)I_1(s) - \frac{MV_2(s)}{sL} \quad (5)$$

Realizing that the mutual inductance between inductors 211a and 211b may be expressed as M=cL, wherein c is a coupling factors, such as, e.g., Coupling Coefficient 212, Equation 5 may be re-expressed as shown in Equation 6.

$$\frac{V_1(s)}{s} + \frac{cV_2(s)}{s} = (L - c^2L)I_1(s) \quad (6)$$

Further simplifying Equation 6, an equation for the coupled inductance can be generated as shown in Equation 7, wherein $L_{eq}$ is defined to be $(1+c^2)L$.

$$V_1 + cV_2 = L_{eq}sI_1(s) \quad (7)$$

Figure 4:
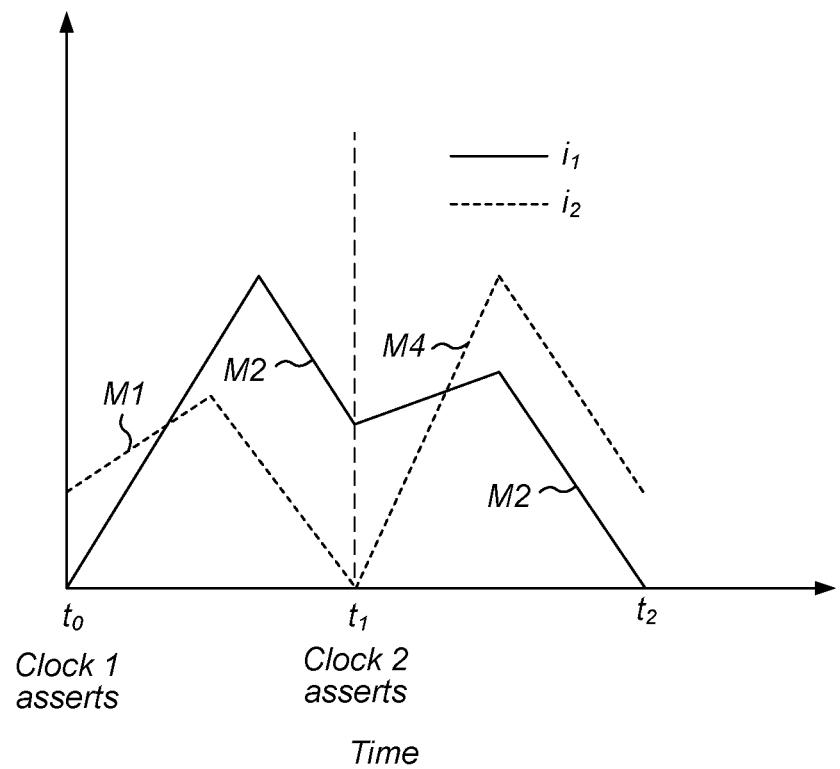
FIG. 4 illustrates sample waveforms associated with using coupled inductors in a regulator unit.

Using Equation 7, it is possible to determine the four possible slopes for the inductor currents during operation of regulator unit 200. The different slopes ($M_1$ through $M_4$) are defined in Equation 8 through Equation 11, wherein $V_i$ is an input voltage from either of the two phase units, and $V_o$ is the voltage level of Regulated Supply 204. An example of the slope of the currents through inductors 211a and 211b is depicted in the waveforms of FIG. 4. Within a particular cycle, only three of the four possible current slopes will appear.

$$M_1 = (1+c)\frac{V_i + V_o}{L_{eq}} \quad (8)$$

$$M_2 = (1+c)\frac{-V_o}{L_{eq}} \quad (9)$$

$$M_3 = \frac{-V_o}{L_{eq}} + c\frac{V_i + V_o}{L_{eq}} \quad (10)$$

$$M_4 = \frac{V_i - V_o}{L_{eq}} - c\frac{V_o}{L_{eq}} \quad (11)$$

Each of the four slopes corresponds to a particular combination of the phase units being on or off. The combinations are illustrated in Table 1.

TABLE 1

| Current Slopes | | |
|---|---|---|
| Phase-0 | Phase-1 | Slope Value |
| ON | ON | $M_1$ |
| OFF | OFF | $M_2$ |
| OFF | ON | $M_3$ |
| ON | OFF | $M_4$ |

In general, the slope compensation can be implemented using Equation 12, where $M_s$ is the compensated slope value.

$$M_s = \frac{V_i}{L_{eq}}m - \frac{V_o}{L_{eq}}n \quad (12)$$

The values of m and n may be derived in a similar fashion to a single inductor case, by using perturbation analysis or any other suitable method. Using such a method results in the expressions for n and m as illustrated in Equations 13 and 14, where T is the period of the clock signal used by a particular phase unit.

$$n = 1 + c \quad (13)$$

$$m = \begin{cases} \frac{1}{2}(1 - \sqrt{1-c^2}), & \text{for } t < \frac{T}{2} \\ c + \frac{1}{2}(1 - \sqrt{1-c^2}), & \text{for } t > \frac{T}{2} \end{cases} \quad (14)$$

Using Equations 12, 13, and 14, an expression for compensated slope may be derived as shown in Equation 15, where T is the period of the clock signal. It is noted that each of the two different phase units may employ a different clock signal, and each of the clock signals may be 180 degrees out of phase with each other. As such, slope compensation circuits, such as will be described below in more detail, included in each of the two phase units may operate at different times, generating currents to be used in slope compensation synchronized to a particular clock signal.

$$M_s = \begin{cases} \frac{V_o(1+c)}{L_{eq}} - \frac{\frac{V_i}{2}(1 - \sqrt{1-c^2})}{L_{eq}}, & \text{for } t < \frac{T}{2} \\ \frac{V_o(1+c)}{L_{eq}} - \frac{\frac{V_i}{2}(1 - \sqrt{1-c^2})}{L_{eq}} - \frac{V_ic}{L_{eq}}, & \text{for } t > \frac{T}{2} \end{cases} \quad (15)$$

Figure 5:
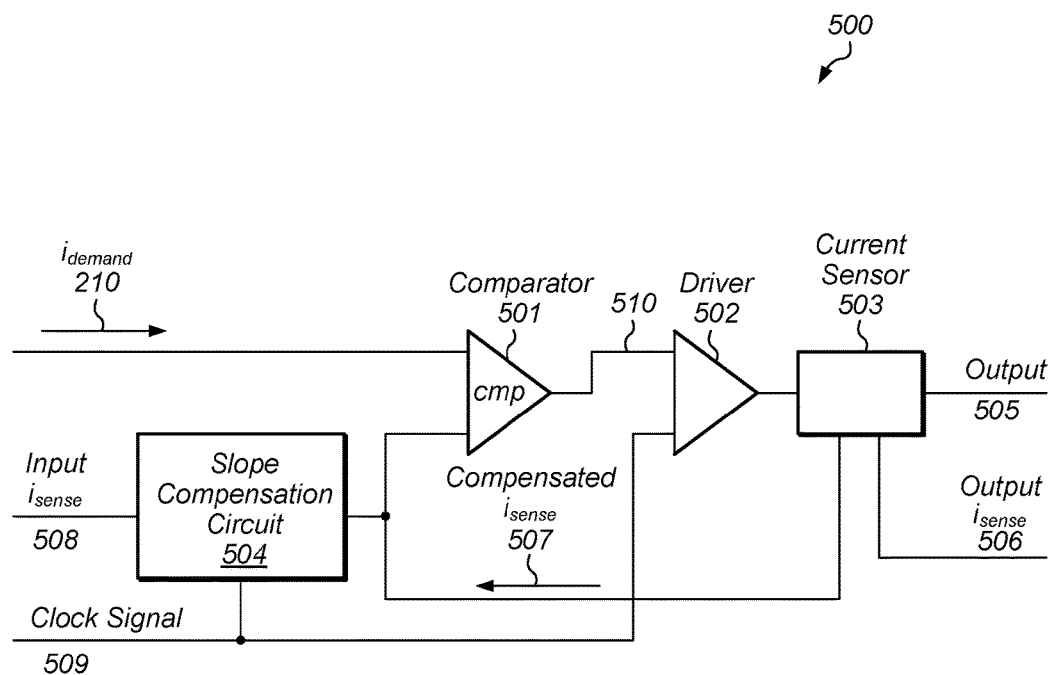
FIG. 5 illustrates an embodiment of a phase unit of a regulator unit.

An embodiment of a phase unit is illustrated in FIG. 5. In various embodiments, phase unit 500 may correspond to either one of Phase-0 Unit 201a or Phase-1 Unit 201b as illustrated in FIG. 2. In the illustrated embodiment, phase unit 500 includes Comparator 501, Driver 502, Current Sensor 503, and Slope Compensation Unit 504.

Comparator 302 may be configured to generate output signal 510 dependent upon a difference between $i_{demand}$ 210 and Compensated $i_{sense}$ 507. In various embodiments, a voltage level of output signal 510 may be proportional to the difference between the values of the two aforementioned current values. In other embodiments, Comparator 500 may generate a digital signal whose logic low level corresponds to a ground potential and whose logic high level corresponds to a voltage level sufficient to enable a n-channel metal-oxide field-effect transistor (MOSFET).

Slope Compensation Unit 504 may be configured to source a current to or sink a current from an output of Current Sensor 502 to generate Compensated $i_{sense}$ 507, which is used as input to Comparator 501. As described below in more detail in regard to FIG. 6, Slope Compensation Unit 504 may activate in response to an assertion of Clock Signal 509, to synchronize the compensation of the output of Current Sensor 502 to the particular clock phase corresponding to Clock Signal 509. Each instance of phase unit 500 used in a regulator unit, such as, e.g., Regulator Unit 101, may be coupled to a separate clock signal. For example, Phase-0 Unit 201a is coupled to clock signal 208a, and Phase-1 Unit 201b is coupled to clock signal 208b. Slope Compensation Unit 504 may activate based upon the assertion of the clock signal corresponding the particular phase unit instance.

Once activated, Slope Compensation Unit 504 may generate an output current as a function of Input $i_{sense}$ 508 in order to improve stability of the current control loop. In various embodiments, Input $i_{sense}$ 508 may a current sensed through an inductor being driven by another phase unit. In some cases, the inductor of the other phase unit, and the inductor used associated with the regulator unit 500 may be inductively coupled. When Clock Signal 509 is deasserted, Slope Compensation Unit 504 may deactivate and remain idle until the next time Clock Signal 509 is asserted.

Driver circuit 502 may, in various embodiments, includes any suitable combination of p-channel and n-channel MOSFETs, that may be configured to source current to or sink current from Output 308 based upon the state of signal on node 510. It is noted that although MOSFETs were described above, in other embodiments, any suitable transconductance devices may be employed.

In some embodiments, Driver 502 may also include a latch circuit that may be configured to set to particular logic state based upon the signal on node 510. The latch may be further configured to reset to another logic state based upon a logic level of Clock Signal 509. The output of the latch may be used to activate and deactivate the aforementioned transistors. Alternatively, the output of the latch may be coupled to a pre-driver circuit, which, in turn, activates and deactivates the aforementioned transistors.

As described above, Driver 502 may include a pre-driver circuit configured to generate control signals used to activate and deactivate drive transistors. In some embodiments, the pre-driver circuit may be configured to independently assert and de-assert the control signals. By independently asserting and de-asserting control signals, current flow from the power supply to ground through the driver transistors (commonly referred to as "shoot through" current) may be reduced.

Current Sensor 503 is configured to determine a current flowing from Driver 502 into Output 508. Slope Compensation Circuit 504 may the modify (or "compensate") the determined current by combining an output current before the modified current is sent to an input of Comparator 501. Current Sensor 502 may also generate Output $i_{sense}$ 506 for use by another phase unit. In various embodiments, Current Sensor 503 may include a resistor in series with Driver 502 and Output 505. A voltage drop across the resistor may be used to generate the measure the current flowing from Driver 502. Current Sensor 306 may also include one or more active devices, such as, e.g., MOSFETs, to form current mirrors, or any other suitable circuits than may be employed to determine the current flowing from Driver 502.

It is noted that the embodiment of the capacitor model illustrated in FIG. 5 is merely an example. In other embodiments, different circuit elements and different configurations of circuit elements may be employed.

Figure 6:
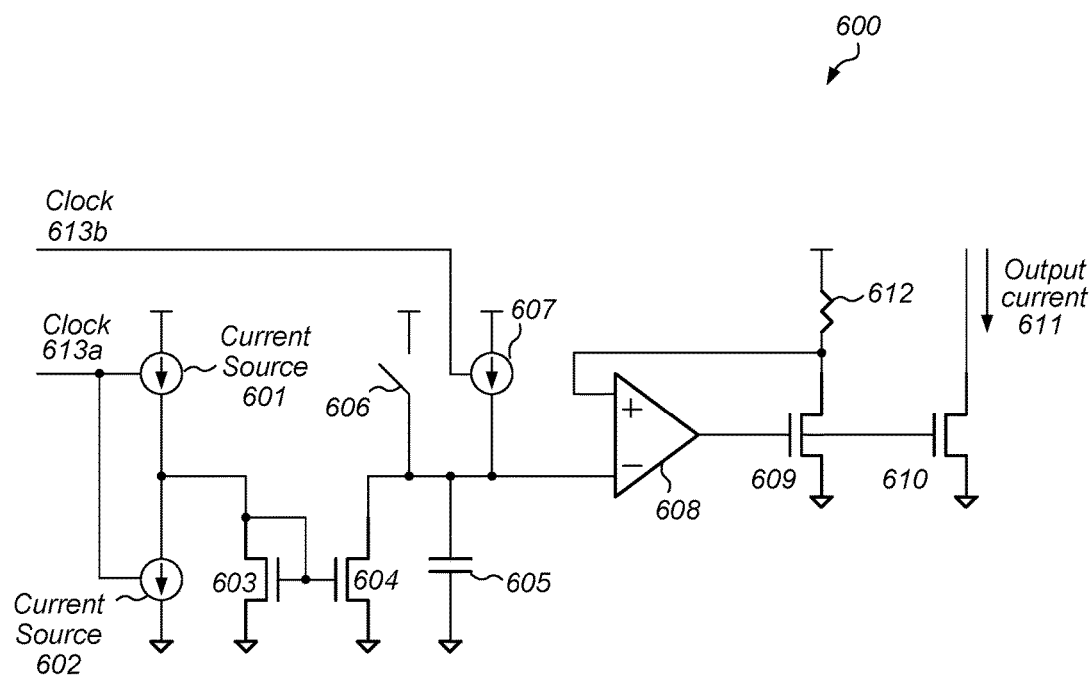
FIG. 6 illustrates an embodiment of a slope compensation unit.

As described above, in order to compensate the control loop of a regulator unit that employs coupled inductors, currents flowing through both inductors must be taken into account. An embodiment of a circuit designed to provide a compensation current for regulator units employing coupled inductors is illustrated in FIG. 6. The embodiment depicted in FIG. 6 may correspond to Slope Compensation Circuit 504, in some embodiments.

In the illustrated embodiment, slope compensation circuit 600 includes Current Sources 601 and 602, transistors 603, 604, 609, and 610, switch 606, capacitor 605, current source 607, differential amplifier 608, and resistor 612. It is noted that transistors 603, 604, 609, and 610 may be implemented as MOSFETs or any other suitable transconductance device. Current Source 601 may generate a current substantially the same as the current flowing through inductor 211a and Current Source 602 may generate a current substantially the same as the current flowing through inductor 211b. In other embodiments, Current Source 601 may generate a current substantially the same as the current flowing through inductor 211b, and Current Source 602 may generate a current substantially the same as the current flowing through inductor 211a.

Each of Current Sources 601 and 602 may include multiple transistors configured as current mirrors or other suitable circuits. Moreover, each of Current Sources 601 and 602 are active in response to the assertion of Clock 613a, which may correspond to either of clock signals 208a and 208b as depicted in FIG. 2.

Transistors 603 and 604 form a current mirror which transfers the sum of the currents provided by Current Sources 601 and 602 to capacitor 605. Switch 606 may be used to charge capacitor 606 to an initial value as part of an initialization process.

As described above in regard to FIG. 3, current source 607 may generate a current proportion to a product of $V_i$ and c, divided by $L_{eq}$ in response to the assertion of Clock 613b. In various embodiments, Clock 613b may correspond to one of clock signal 208a and 208b, and may be 180 degrees out of phase from Clock 613a. By employing two different clock signals in the design of slope compensation circuit 600, the different current values for different periods of the clock cycle, as specified in Equation 15, may be achieved. Current source 607 may include any suitable combination of transistors or passive circuit elements configured to generate the aforementioned current.

Differential amplifier 608 may be configured to amplify a difference between the voltage across capacitor 605 resulting from summing the currents from current source 607 and the current mirror formed by transistors 603 and 604, and the voltage drop across resistor 612. The output of differential amplifier controls transistors 609 and 610. Transistor 610 sinks Output current 611, which is combined with the output of Current Sensor 503 to form Compensated $i_{sense}$ 507. Combining the aforementioned currents results in slopes on Compensated $i_{sense}$ 507 that provide stability for the current control loop of phase unit 500.

It is noted that the embodiment depicted in the embodiment of FIG. 6 is one particular example of a slope compensation circuit. In other embodiments, different circuit elements and different arrangements of circuit elements may be employed.

Figure 7:
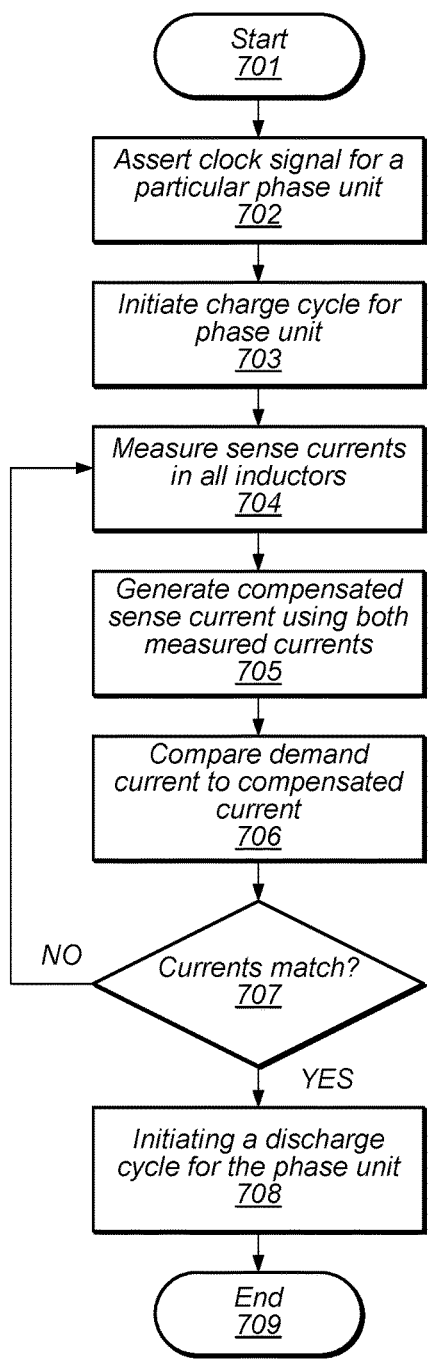
FIG. 7 depicts a flow diagram illustrating an embodiment of a method for operating a phase unit of a regulator circuit.

Turning to FIG. 7, a flow diagram depicting an embodiment of a method for operating a phase unit of a regulator circuit is illustrated. Referring collectively to FIG. 2, FIG. 5, FIG. 6, and the flow diagram of FIG. 7, the method begins in block 701.

A clock signal coupled to Phase-0 Unit 201a may then be asserted (block 702). The assertion of the clock signal results in Phase-0 Unit 201a initiating a charge cycle (block 703). During the charge cycle, Driver 502 may source current to a load circuit coupled to Regulated Supply 204 via inductor 211a. It is noted that while the Phase-0 Unit 201a is performing a charge cycle, other phase units, such as, e.g., Phase-1 Unit 201b may also be sourcing current to the load circuit via inductor 211b.

Currents flowing through inductors 211a and 211b may then be sensed (block 704). In various embodiments, a current sensor, such as, e.g., Current Sensor 503, may sense a current flowing from a driver circuit. In some cases, at least a portion of current flowing through a particular inductor may be the result of inductive coupling from other inductors.

Phase-0 Unit 201a may then generate a compensated sense current for the (block 705). In addition to the current sensed through inductor 211a, the current sense through inductor 211b may be also used to generate the compensated current. As described above, the compensated current may have a particular value during the first half of the clock cycle of the clock signal, and a different value for the remaining half of the clock cycle.

Comparator 501 may then compare the compensated sense current to $i_{demand}$ 210 (block 706). Transconductance Circuit 209 generates the $i_{demand}$ 210, which is used by both Phase-0 Unit 201a and Phase-1 Unit 201b, by comparing a voltage level of Regulated Supply 204 with a voltage level reference voltage 207, and generating a current based on any difference between the two voltage levels. The method may then depend on a result of the comparison of the compensated sense current and $i_{demand}$ 210 (block 707).

If the demand current and the compensated current do not match, then the method may continue from block 704 as described above. Alternatively, Phase-0 Unit 201a may initiate a discharge cycle when the demand current and the compensated current match (block 708). During the discharge cycle, Driver 502 may sink a current from the load circuit coupled to Regulated Supply 204 through inductor 211a. It is noted that although Phase Unit-0 201a is performing a discharge cycle, Phase-1 Unit 201b may be performing either a charge or discharge cycle. The method may then conclude in block 709.

It is noted that the embodiment of the method illustrated in the flow diagram of FIG. 7 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first inductor coupled to a power supply node included in a load circuit;
   a second inductor coupled to the power supply node and inductively coupled to the first inductor;
   a transconductance circuit configured to generate a demand current using a voltage level of the power supply node and a reference voltage; and
   a first phase unit configured to:
      initiate a first charge cycle of the power supply node through the first inductor in response to an assertion of a first clock signal;
      generate a first compensated current using a first current measured through the first inductor, a second current measured through the second inductor, the first clock signal, and a coupling coefficient betweeen the first inductor and the second inductor; and
      halt the first charge cycle in response to a determination that first compensated current is greater than the demand current.

2. The apparatus of claim 1, wherein the first phase unit includes a slope compensation circuit configured to generate a proportional current whose value is based on a voltage level at an output of the first phase unit and the coupling coefficient between the first inductor and the second inductor.

3. The apparatus of claim 2, wherein the slope compensation circuit is further configured to charge a capacitor using a difference between the proportional current and a sum of the first current and the second current.

4. The apparatus of claim 3, further comprising a second phase unit configured to initiate a second charge cycle of the power supply node through the second inductor in response to an assertion of a second clock signal.

5. The apparatus of claim 4, wherein the slope compensation circuit is further configured to:
   discharge the capacitor using the first clock signal and the sum of the first current and the second current; and
   charge the capacitor using the second clock signal and the proportional current.

6. The apparatus of claim 1, wherein to initiate the first charge cycle, the first phase unit is further configured to source a charging current to the power supply node via the first inductor.

7. A method, comprising:
   generating a demand current using a voltage level of a power supply node included in a load circuit and a reference voltage, wherein the power supply node is coupled to a first inductor and a second inductor, and wherein the second inductor is inductively coupled to the first inductor;
   initiating a first charge cycle of the power supply node through the first inductor in response to an assertion of a first clock signal;
   generating a first compensated current using a first current measured through the first inductor, a second current measured through the second inductor, the first clock signal, and a coupling coefficient between the first inductor and the second inductor; and
   halting the first charge cycle in response to determining that the first compensated current is greater than the demand current.

8. The method of claim 7, wherein generating the first compensated current includes generating a proportional current whose value is based on a voltage level at a terminal of the first inductor and the coupling coefficient between the first inductor and the second inductor.

9. The method of claim 8, wherein generating the first compensated current further includes charging a capacitor using a difference between the proportional current and a sum of the first current and the second current.

10. The method of claim 9, further comprising initiating a second charge cycle of the power supply node through the second inductor in response to an assertion of a second clock signal.

11. The method of claim 10, wherein generating the first compensated current includes:
   discharging the capacitor using the first clock signal and the sum of the first current and the second current and charging the capacitor using the second clock signal and the proportional current.

12. The method of claim 7, wherein initiating the first charge cycle includes sourcing a charging current to the power supply node via the first inductor.

13. The method of claim 7, wherein halting the first charge cycle includes sinking a discharge current from the power supply node via the first inductor.

14. A system, comprising:
a plurality of circuit blocks;
a first inductor coupled to a power supply node of a particular circuit block of the plurality of circuit blocks;
a second inductor coupled to the power supply node of the particular circuit block, wherein the second inductor is inductively coupled to the first inductor;
a regulator circuit configured to:
generate a demand current using a voltage level of the power supply node and a reference voltage;
initiate a first charge cycle of the power supply node through the first inductor in response to an assertion of a first clock signal;
generating a first compensated current using a first current measured through the first inductor, a second current measured through the second inductor, the first clock signal, and a coupling coefficient between the first inductor and the second inductor; and
halting the first charge cycle in response to determining that the first compensated current is greater than the demand current.

15. The system of claim 14, wherein to generate the first compensated current, the regulator circuit is further configured generate a proportional current whose value is based on a voltage level at an output of the regulator circuit and the coupling coefficient between the first inductor and the second inductor.

16. The system of claim 15, wherein to generate the first compensated current, the regulator circuit is further configured to charge a capacitor using a difference between the proportional current and a sum of the first current and the second current.

17. The system of claim 16, wherein the regulator circuit is further configured to initiate a second charge cycle of the power supply node through the second inductor in response to an assertion of a second clock signal.

18. The system of claim 17, wherein the regulator circuit is further configured to:
discharge the capacitor using the first clock signal and the sum of the first current and the second current; and
charge the capacitor using the second clock signal and the proportional current.

19. The system of claim 14, wherein to initiate the first charge cycle, the regulator circuit is further configured to source a charging current to the power supply node via the first inductor.

20. The system of claim 14, wherein to halt the first charge cycle, the regulator circuit is further configured to sink a discharge current from the power supply node via the first inductor.

* * * * *